United States Patent [19] — [11] 4,328,498

Yoder — [45] May 4, 1982

[54] PHASED ARRAY ANTENNA FOR SATELLITE

[75] Inventor: Max N. Yoder, Washington, D.C.

[73] Assignee: The United States of America as represented by the Secretary of the Navy, Washington, D.C.

[21] Appl. No.: 48,590

[22] Filed: May 21, 1970

Related U.S. Application Data

[63] Continuation-in-part of Ser. No. 24,937, Mar. 6, 1970.

[51] Int. Cl.[3] .......... G01S 3/74; H01Q 3/26

[52] U.S. Cl. .......... 343/100 SA; 315/34; 343/100 ST; 343/854

[58] Field of Search .......... 343/100 SA, 854, 100 ST; 325/32; 315/34

[56] References Cited

U.S. PATENT DOCUMENTS 2,691,076 10/1954 Moore et al. .......... 330/13

3,295,134 12/1966 Lowe .......... 343/100 SA 3,531,803 9/1970 Rosen et al. .......... 343/100 SA

OTHER PUBLICATIONS

IEEE Conference Proceedings, 8th International Convention on Military Electronics, Sep. 1964, pp. 369–375.

*Primary Examiner*—Maynard R. Wilbur
*Assistant Examiner*—Richard E. Berger
*Attorney, Agent, or Firm*—Robert F. Beers; William T. Ellis

[57] ABSTRACT

A spin stabilized, earth orbitting satellite having a phased array antenna capable of radiating a plurality of steered electromagnetic beams to predetermined earth locations. The antenna array extends around the satellite and is made up of individual elements which are energized through semiconductor diode devices by electron beams. The electron beams are controlled by fields having the same frequency as the spin frequency of the satellite.

9 Claims, 4 Drawing Figures

PHASED ARRAY ANTENNA FOR SATELLITE

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATIONS

This application is a continuation-in-part of patent application, Ser. No. 24,937 filed Mar. 6, 1970 by Max N. Yoder for ELECTRON BEAM CONTROLLED ARRAY ANTENNA.

BACKGROUND OF THE INVENTION

Concurrent with the development of the technological capability of putting satellites into an earth orbit, there has also developed a technology of diverse purposes for which these satellites can be used.

In many of these known uses the level of system performance could be greatly enhanced, and some new uses would becomes feasible, if a highly efficient, highly directional communications link between the earth and the orbitting satellite could be developed. For example, a highly directional communications link would tremendously increase the difficulty to an enemy of either jamming or "listening in" on a secure message system. There is, of course, the further advantage that a highly efficient, highly directional communications link that does not require a large amount of power for the electromagnetic beam steering, will lower the satellite electric power load, an improvement which is very desirable for obvious reasons.

Prior to the present invention, communications links between the orbitting satellites and the earth have been relatively inefficient, broad beamed and usually very frequency limited. The reasons for this include the use of spin stabilization to spatially orient the satellite (considered to be a "must" in almost all systems). This satellite spin has effectively inhibited the use of highly directional antennas, such as phased array antennas, although unsuccessful efforts have been made to mechanically despin the array antenna structure, i.e. the antenna array and the main satellite body spin in equal and opposite directions. Problems associated with coupling the electromagnetic energy from the main satellite body to the antenna array have been found to be so insurmountable as to preclude any serious implementation of the despinning antenna array concept. It is to be noted, however, that mechanically despun parabolic antennas featuring narrow electromagnetic beams have been used. These antenna systems are not entirely satisfactory because they are very slow in steering the electromagnetic beam and do not permit simultaneous transmission of different beams in different directions and have relatively high power requirements for the beam steering.

Other prior communications links have used travelling wave tube (TWT) amplifiers to energize antenna systems which do not attempt beam steering but radiate a cone shaped electromagnetic beam that waste most of the radiated energy in illuminating vast areas of the earth for which there is no need for coverage. The indiscriminate broadcasts can also create security, i.e. "listening in" problems. Further, in order to achieve even a reasonable efficiency, such as 20%, with the TWT, the bandwidth of prior satellite-earth communications links have had to be considerably reduced, accompanied by a reduction in the number of communication channels that can be handled.

SUMMARY OF THE INVENTION

The invention disclosed herein overcomes many of the disadvantages of the previously discussed prior communications links by providing a phased array antenna which extends around the satellite and which radiates a plurality of steered beams to predetermined earth locations. Individual elements of the antenna array are energized through semiconductor diode devices by electron beams in a manner similar to that described in the previously mentioned patent application, Ser. No. 24,937. Control of the electron beams includes an interaction with fields having the same frequency as the spin frequency of the satellite.

OBJECTS OF THE INVENTION

It is, therefore, an object of the invention to provide an improved phased array antenna for use with a spin stabilized earth satellite.

Another object is to provide an improved phased array antenna which is capable of radiating a plurality of steered beams with a minimal power requirement for beam steering and which is particularly suited for use on a spin stabilized earth satellite.

A still further object is to provide an improved phased array antenna which is capable of radiating a plurality of steered beams and which is particularly suited for use on a spin stabilized earth satellite and wherein the individual elements are energized by p-n junction devices that are controlled by electron beams which interact with fields having the same frequency as the spin frequency of the satellite.

DESCRIPTION OF THE DRAWINGS

Other objects and advantages of the invention will hereinafter become more fully apparent from the following description and the annexed drawings, which illustrate a preferred embodiment, and wherein.

DESCRIPTION OF THE INVENTION

Before proceeding with the description of the invention, the reader is cautioned that the drawings should not be construed as being anything more than a representation of practical structure. Many dimensions have been shown out of scale and structure has obviously been simplified, all for the purpose that the disclosure of the invention might be presented in a manner having clarity of illustration and description.

Figure 1:
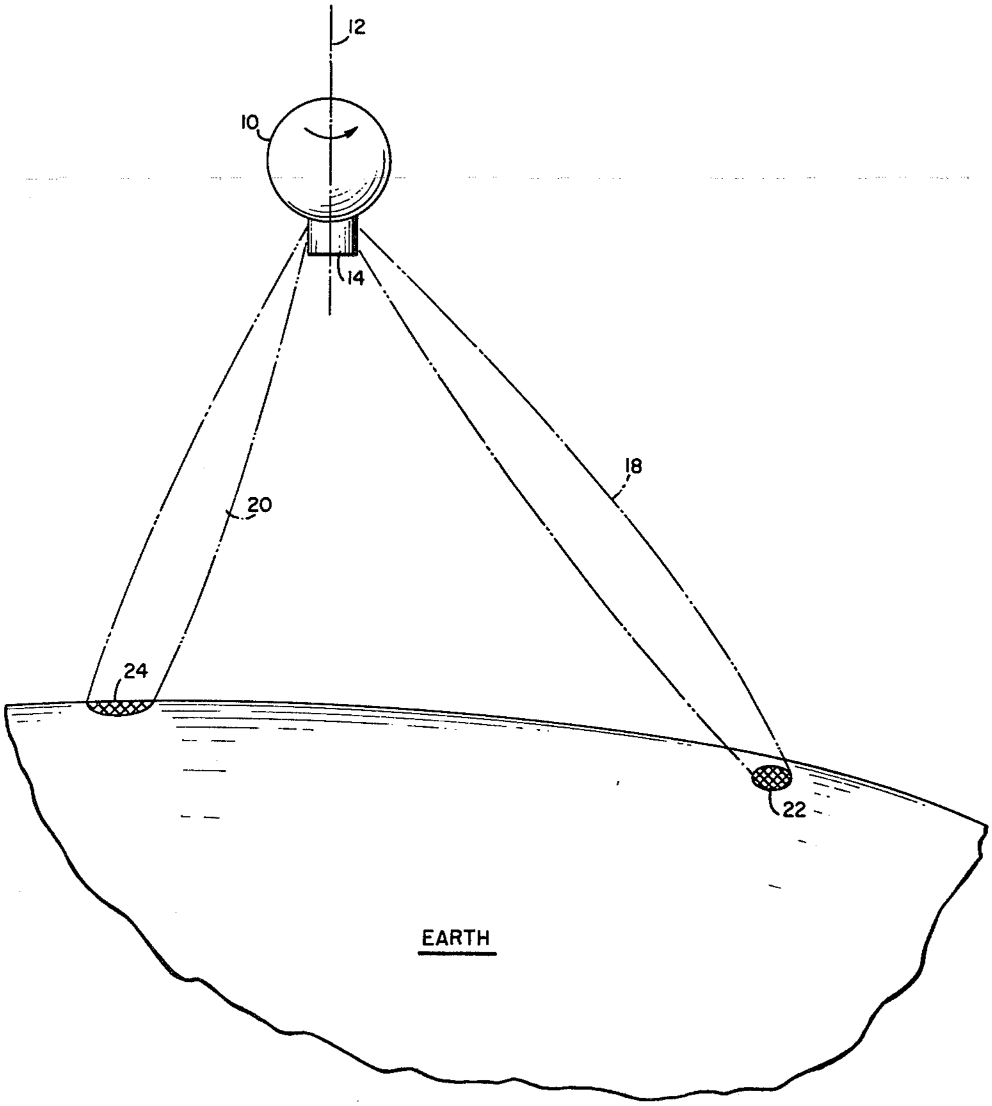
FIG. 1 shows the invention in operation on a spin stabilized earth satellite.

Referring now to the drawings, wherein like reference numerals designate like or corresponding parts throughout the several views, there is shown in FIG. 1 a view of the invention in operation on a satellite 10 which is in orbit around the earth. As represented by the arrow, satellite 10 is spin stabilized about the vertical spin axis 12. Located below the main body of satellite 10 is the structure 14, which is shown in more detail and will be described in connection with FIG. 2. Structure 14 contains the phased array antenna that is a major feature of the present invention and which is made up of individual elements 16 (FIG. 2) that are energized in a later described, controlled manner to radiate the two electromagnetic beams 18 and 20 that form two communications links between the satellite 10 and predetermined points 22 and 24 on the earth which are, as shown, illuminated by beams 18 and 20.

Figure 2:
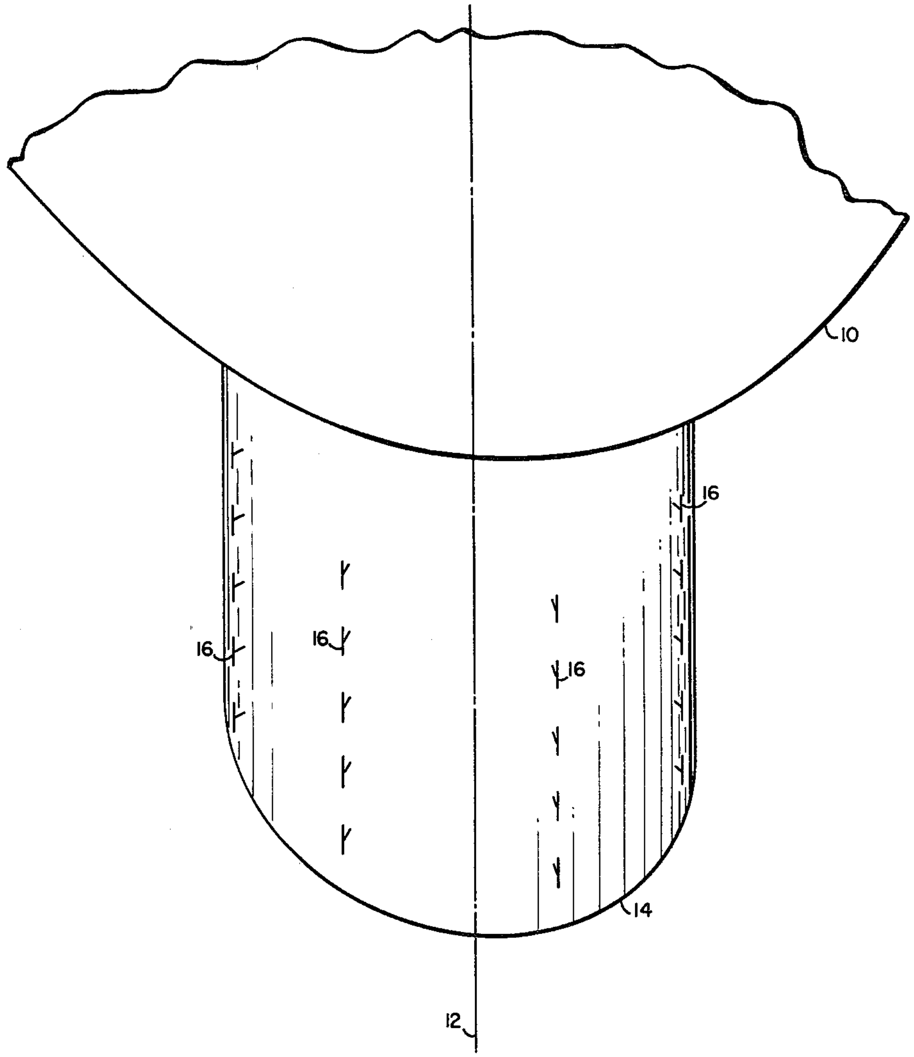
FIG. 2 is a perspective exterior view of the invention.

As shown in FIG. 2, the array antenna includes 5 tiers, one on top of the other and containing a plurality of antenna elements 16 which are equally spaced in eight columns circumferentially about the structure 14. The elements 16 are preferably exteriorly mounted dipoles which are center grounded and energized from the interior of structure 14.

The reader will, of course, realize that the number of tiers and columns shown is merely for purposes of illustration and not limitation, and that any practical number of both tiers and columns can be used. In this same context, radiating elements other than dipoles can also obviously be used as the antenna elements 16. In this regard, it may be of interest to note that for a carrier frequency of 10 GHz, the length of a half wave dipole is only 1.5 cm. It should also be realized that the showing of only two beams 18 and 20 should not be considered as implying that this is the maximum number of beams which can be radiated by the invention. Since, as will be more evident from subsequent portions of this disclosure, the operation of the phased array antenna and of the semiconductor diode devices which energize the individual elements 16 is linear, three, four or more beams can simultaneously be radiated to illuminate predetermined locations on the earth.

Figure 3:
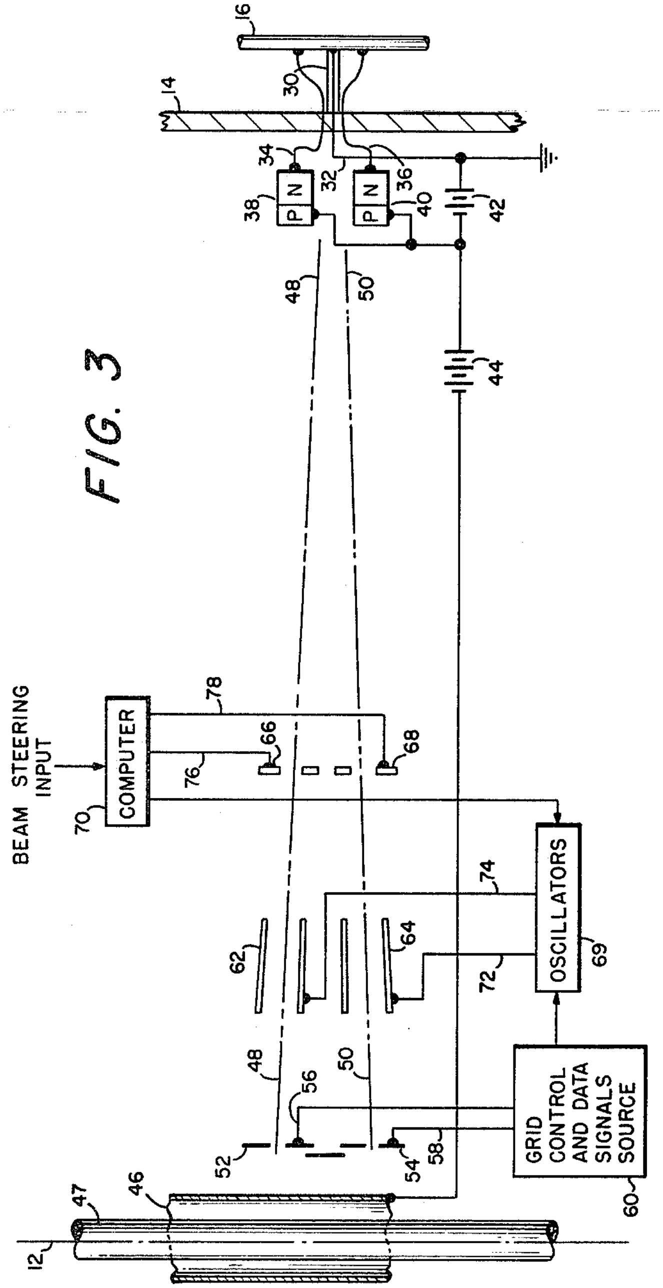
FIG. 3 is an illustration, including structural representations and a circuit diagram, relating to one antenna element.

FIG. 3 illustrates an individual element 16 of the antenna array together with structural and circuit representations relating to the controlled energization of the antenna element. In addition to the following description of FIG. 3 the reader may wish to refer to the previously mentioned patent application, Ser. No. 24,937, which describes in somewhat greater detail the background and operation of a related invention.

As shown in FIG. 3, the antenna element 16 is mounted on the exterior of structure 14 by a member 30 which also serves as an electrical insulator. The center of antenna element (dipole) 16 is grounded by lead 32 and the opposing halves of dipoles 16 are connected by leads 34 and 36 as the loads of p-n devices 38 and 40 which are back biased by the potential source 42. while the potential source 42 has been illustrated as a battery, it will be apparent that this, and other such illustrated source of potentials, can alternatively, and usually more conveniently, be obtained from other types of DC power supplies. One such source 44 is the accelerating potential that exists between cathode 46 and the p-n junction devices 38, 40. Cathode 46 extends concentrically around the intended spin axis 12 and boils off electrons which are used to form electron beams that bombard the p-n junction devices, such as 38, 40. As is no doubt evident to the reader, in the illustrated embodiment of the invention (which is, of course, nonlimiting numerically) where there are shown 5 tiers and 8 columns of elements 16, the cathode 46 serves as the source of electrons for bombarding 80 p-n junction devices. If desired, as a practical design matter, a conduit 47 may be located inside cathode 46 for the purpose of passing leads, etc.

Electrons from the cathode 46 are focused into electron beams 48 and 50 by grids 52 and 54, the potentials of which are controlled via leads 56 and 58 by a source of signals 60. The signals on leads 56 and 58 may contain information, i.e. data, messages, etc., which it is desired to transmit by beams 18 and 20 (FIG. 1) to predetermined locations on the earth. These signals are used to modulate the electron beams 48 and 50 in a variety of ways, such as amplitude and/or frequency modulation, pulse (on-off) code modulation, etc. since the voltage on grids 52 and 54 control the rate of electron flow in the beams 48, 50. In normal operation grides 52 and 54 are concentric about the spin axis 12. If equal radiated electromagnetic power is desired in each electromagnetic beam, the DC potential applied to grids 52 and 54 is the same.

After being focused by grids 52 and 54, the electron beams 48 and 50 are further accelerated toward the p-n junction devices 38, 40 and through the pairs of travelling wave deflection plates 62 and 64 and through the hollow anodes 66 and 68. In the quiescent state the electron beams 48, 50 impinge between the p-n junction devices 38 and 40 (as shown in FIG. 3) and do not cause dipole 16 to be energized. If the p-n diode pair is separated by a distance equal to the width of the electron beam in its quiescent (no deflection signal) state, then class B amplification results. If separated a greater distance, class C operation results and if separated a lesser distance, class AB operation results.

Travelling wave deflection plates 62 and 64 are typically fed by oscillators 69 through leads 72 and 74 with microwave signals at their cathode end. These signals are of the respective carrier (rf) frequencies of the radiated electromagnetic beams 18 and 20 which are formed by the array antenna. Generally, the beams 18 and 20 (and the rf signals on the deflection plates 62 and 64) are of different frequencies. In other words, the frequency of beam 18 and the signal on the associated deflection plate, say 62, are equal but are generally different from the frequency of the beam 20 and the signal on plate 64.

In the case where grids 52 and 54 are used to modulate the rf signals, the signals applied to plates 62 and 64 can be cw (continuous wave). The rf signals applied to plates 62 and 64 may be either amplitude and/or frequency modulated rf, in which case grids 52 and 54 may be energized with DC.

The instantaneous polarity of the signal on the deflection plates 62 and 64 deflects the respective electron beam a proportional amount onto the respective diode target 38, 40. The DC bias potential on the plates 62 and 64 is normally held close to that on grids 52 and 54.

Hollow anodes 66 and 68 serve as post deflection acceleration and retardation anodes, i.e. the potentials on these anodes function to accelerate or retard the electrons in the beams 48 and 50 after they have been transversely deflected at an rf rate by the signals applied to the deflection plates 62 and 64. The potentials on anodes 66 and 68 are applied by a computer 70 through leads 76 and 78. The details of computer 70 are beyond the scope of the present invention and it is only necessary to disclose that computer 70 receives an input from a variety of sources, such as the earth, satellite instrumentation, etc.

It is worthy of emphasis that the velocity, and hence the transit time, of the electron beams 48 and 50 can be regulated by anodes 66 and 68 in a manner which is independent of the rf rate at which the electron beam is being transversely deflected. This results in a linear phase vs frequency relationship of the output signals of the diodes 38, 40, a linearity that extends over several octaves of frequency. The constant of proportionality between phase and frequency is controlled by the potential on anodes 66 and 68. The reader will, of course, appreciate that the electron beams 48 and 50 pass through anodes 66 and 68 and do not impinge on them. This feature is important in that only a negligible amount of energy is required to change the potential on anodes 66 and 68. A corollary of this is that these potentials can be changed very rapidly and, as later discussed more fully, allows the direction of the radiated electromagnetic beams 18 and 20 to be rapidly changed. Potential changes on anodes 66 and 68, however, do not change the velocity of the electrons impinging upon the p-n junction devices 38 and 40 since the electrons always fall through the same overall accelerating potential 44.

Separate transit time variations (and hence separate phase versus frequency control) can be applied to signals of different rf signals applied to the deflection plates 62 and 64. Inasmuch as the overall device of the invention is very linear, two different rf signals of different frequencies can thus be radiated simultaneously from a particular dipole 16 and each signal can be given independent phase control. Moreover, the relative power between these signals can be regulated by adjusting the potentials on the grids 52 and 54.

Figure 4:
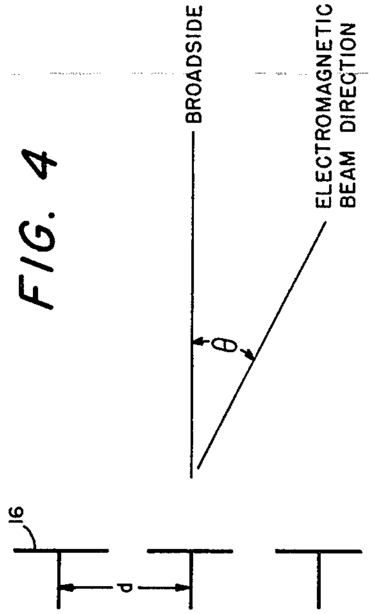
FIG. 4 is a sketch that is helpful in understanding a feature of the invention.

FIG. 4 will assist in an examination of the relationship between adjacent radiating elements 16 of a phased array antenna and will assist the reader in understanding the utility of the transit time control properties of the invention. Considering three adjacent elements 16 which are separated by a distance d and are energized to radiate an electromagnetic beam at an angle $\theta$ from broadside, the following equation applies:

$$\sin\theta=\phi L/2\cdot\text{pi}\cdot d \quad (1.1)$$

where $\theta$=angle from broadside at which the electromagnetic beam is radiated L=free space wavelength of electromagnetic beam d=spacing between adjacent radiating elements $\phi$=phase displacement between signals feeding adjacent elements Let the period of one r.f. cycle be $$T=1/f. \quad (1.2)$$

Let the differential time of signal delay between adjacent elements be t. Then, $$\phi=(t/T)\cdot 2\text{pi radians.} \quad (1.3)$$

Substitution of (1.2) into (1.3) yields $$\phi=t\cdot f\cdot 2\text{pi}. \quad (1.4)$$

But $$f=c/L, \quad (1.5)$$

Where c=free space velocity.

Upon substitution, $$\phi=t\cdot c\cdot 2\text{pi}/L. \quad (1.6)$$

Substitution of (1.6) into (1.1) yields $$\sin\theta=t\cdot c/d. \quad (1.7)$$

This it is seen that electromagnetic beam steering is independent of frequency and is directly proportional to differential transit time.

It can be seen that once the transit time variations between adjacent radiating elements is adjusted by potentials on anodes 66 and 68 such that the associated electromagnetic beam is radiated in a direction $\theta$, then signals of any frequency applied to deflection plates 62 and/or 64 will also be radiated in that direction.

If the array of antenna elements is rotating at the angular velocity w of the spin stabilized satellite, then the mere application of an alternating potential of frequency w/2pi by computer 70 to the anodes 66 and 68 will "despin" the radiated electromagnetic beam. The application of additional DC potentials between the 40 anodes 66 and the 40 anodes 68 by computer 70 will control the direction of the despun electromagnetic beams 18 and 20 formed by the 40 anodes 66 and the 40 anodes 68. It will be realized, of course, that the pattern of the DC potentials applied to the 40 anodes 66 may be different than that applied to the 40 anodes 68, i.e. the beams 18 and 20 can be independently steered since the rf signals applied to plates 62 will suffer a transit time delay different from those signals applied to plates 64. Hence the radiated electromagnetic signals will be in different directions for the two signals, but both will be despun with respect to satellite rotation because of the w/2pi signal also applied by the computer 70.

It is considered to be again worthy of emphasis that electron beams 48 and 50 are independent and form the basis of two separate communications links that include the separately radiated electromagnetic energy beams 18 and 20. In general, these two communications links will have a different carrier frequency and contain different information. It is also emphasized that more than two electron beams can be used to energize each of the dipoles 16. In FIG. 3, for example, it is obvious that another pair of electron beams could be formed at a different vertical location and also bombard the p-n junction devices 38, 40.

The operation of the disclosed embodiment of the invention is by now, no doubt, apparent. Using well known techniques which are beyond the scope of the invention, the satellite 10 is put into earth orbit, oriented and spin stabilized about the vertical axis 12. According to a predetermined schedule, or by command from earth, information is accumulated in the satellite 10 and then, under the control of signal source 60 and computer 70, is transmitted to earth points 22 and 24 by electromagnetic energy beams 18 and 20 that are radiated by the phased array antenna that is made up of a plurality of elements 16 which are located on the exterior of satellite structure 14. More specifically, in the embodiment illustrated in FIG. 2, the array antenna includes five tiers and eight columns and, therefore, 40 of the dipoles 16.

Data signals source 60 puts information, in the form of modulated voltages, on all of the grids (anodes) which form the electron beam from the electrons boiled off cathode 46 and/or on the signals applied by oscillators 69 to the deflection plates 62, 64. In the disclosed embodiment there are 80 grids which form 80 electron beams. Signal source 60 produces two signals, each of which may be applied to 40 grids and/or to appropriate deflection plates. As shown in FIG. 3 the grids 52 and 54 each receive one of the two signals from source 60, the invention (modulations) of which are transferred to the two electron beams 48 and 50. However, if desired the rf signals from oscillators 69 may contain intelligence in the form of amplitude, phase and/or frequency modulations, in which case the grids 52 and 54 need not carry intelligence but only beam forming and power level DC potentials.

When a particular dipole 16 is not required to form one of the electromagnetic beams 18, 20, computer 70 does not cause oscillator 69 to apply rf signals to the appropriate deflection plates (62 and 64 in FIG. 3) and the electron beams (48 and 50 in FIG. 3) impinges between the back-biased p-n junction devices which energize the dipoles 16. When the stabilizing spin of satellite 10 brings a particular dipole 16 into a position where its radiated field is required for one or both of beams 18 and 20, one or both of the associated deflection plates receives rf energy from oscillator 69 which causes the electron beam to bombard the respective p-n junction devices and energize the dipole 16. In general, the carrier frequencies of the beams 18 and 20 are different and are supplied by two different frequency rf oscillators without phase modulations to the deflection plates, such as 62 and 64 in FIG. 3. However, if desired, the rf signals may also contain intelligence.

The phase variations which are necessary to steer or "despin" the electromagnetic beams 18 and 20 are placed by computer 70 on the electron beams by fields related to the voltages (having a component of frequency equal to the satellite spin frequency w/2pi) that are placed on the post-deflection anodes, such as 66 and 68 shown in FIG. 3, which cause a variation of the time-of-travel for the electrons in the electron beams, and an accompanying variation of the phase of the field radiated by the associated dipole 16 and the desired directional steering of radiated beams 18 and 20. However, the voltages placed on the post-deflection anodes do not alter the impinging velocities of the electrons on the p-n junction devices (or distort the amplitude modulations imparted to the radiated electromagnetic field by the information signals on the grids, such as 52 and 54) since the potential difference 44 between the cathode 46 and the p-n junction devices is not altered.

In summary, the grids 52 and 54 may add the information to be transmitted by the beams 18 and 20; the carrier frequencies (and information) are added by the deflection plates 62 and 64 and the beam steering, phase adjustments are added by post-deflection anodes 66, 68.

There has been disclosed an improved phase array antenna which is capable of radiating a plurality of independently steered beams and which is particularly suited for use in a spin stabilized earth satellite and wherein the individual antenna elements are energized by p-n junction devices that are controlled by electron beams. Each of the independently steered electromagnetic beams may also be independently controlled as to instantaneous frequency and power.

Obviously many modifications and variations of the disclosed embodiment of the invention are possible in the light of the above teachings. For example, the number of electromagnetic beams 18, 20; the number of electron beams 48, 50; the number of dipoles 16, etc., could obviously be different than as shown. Also, because of the high carrier frequencies possible, the signals applied by source 60 to grids 52 and 54 may contain several messages or data on several subcarrier frequencies. Further, other forms of semiconductor diode devices, such as n-p junction devices, could be used to energize the antenna elements, etc. It is therefore to be understood, that within the scope of the appended claims, the invention may be practiced otherwise than as specifically described.

What is claimed and desired to be secured by Letters Patent of the United States is:

1. An improved phased array antenna capable of radiating a plurality of independently controlled, information carrying, electromagnetic beams for use with a revolving structure, comprising:

a plurality of antenna elements located on said revolving structure and in a pattern which extends around the axis of revolution of said revolving structure;

a plurality of semiconductor diode devices connected to each of said antenna elements and biased so as to energize said antenna elements when bombarded by a beam of electrons;

cathode means located inside said pattern of antenna elements for supplying electrons for bombarding said semiconductor diode devices and electron beam forming and control means located between said cathode means and said plurality of semiconductor diode devices, for forming and modulating electron beams and for controlling said electron beams to selectively bombard said plurality of semiconductor devices in a manner which energizes said plurality of antenna elements to radiate electromagnetic energy beams in predetermined directions.

2. The phased array antenna of claim 1 wherein said electron beam forming and control means includes:

a source of signals containing information it is desired to include as modulations in said electromagnetic beams;

computer means for controlling said electron beam forming and control means and oscillator means connected to said computer means and to said source of signals for producing modulated rf signals and wherein each of said plurality of antenna elements is operatively associated with:

grid means located adjacent said cathode means and connected to said source of signals for forming one or more electron beams and for modulating said formed one or more electron beams with representations of said desired information;

deflection plate means connected to said computer means through said oscillator means and when not energized by said oscillator means, allowing said formed one or more electron beams to pass in a direction which will not cause said semiconductor diode devices to energize said operatively associate antenna element and, when energized by said oscillator means, deflecting said formed one or more electron beams in a manner which causes said semiconductor diode devices to energize said operatively associated antenna element to radiate modulated rf electromagnetic energy and steering anode means, located between said deflection plate means and said semiconductor diode devices connected to energize said operatively associated antenna element, and connected to said computer means for varying the time of flight of electrons in said formed one or more electron beams from said cathode means to said semiconductor diode devices by interacting said beams with fields having a frequency equal to the frequency of revolution of said structure whereby as said structure revolves, said plurality of antenna elements are energized in such a way as to radiate a plurality of independently controlled, information carrying rf electromagnetic beams in predetermined directions.

3. The phased array antenna of claim 2 wherein said semiconductor diode devices are p-n junction devices and said antenna elements are center grounded dipoles connected to both sides as the load of a p-n junction device.

4. The combination of a spin-stabilized earth satellite having an axis of revolution and an improved phased array antenna system wherein said antenna system comprises:

a plurality of antenna elements located on the exterior of said satellite and arranged in a pattern which extends around the axis of revolution of said satellite; and energizing means connected to said plurality of antenna elements for energizing said antenna elements to radiate beams of information-carrying electromagnetic energy in directions which will illuminate predetermined locations on the earth as said spin-stabilized satellite orbits around the earth, said energizing means includng two semiconductor diodes connected to each of said plurality of antenna elements and biased to energize said antenna element when bombarded by a stream of electrons.

5. The combination of claim 4 wherein said antenna elements are center grounded dipoles connected on both sides as the load of a semiconductor diode device.

6. The combination of claim 5 wherein said semiconductor diode devices are p-n junction devices.

7. The combination of claim 4 wherein said energizing means further includes:

cathode means located inside said pattern of antenna elements for supplying electrons for bombarding said semiconductor diode devices;

a source of signals containing information it is desired to include as modulations in said radiated beams of electromagnetic energy;

computer means including rf oscillator means for supplying signals that are correlated with the revolution of said spin stabilized earth satellite and with the relative position of said satellite to said predetermined earth locations and electron beam forming and control means located between said cathode means and said semiconductor diode devices and connected to said source of signals and to said computer means and functioning to form a plurality of electron beams and impart thereto:

modulations representative of the information desired to be included in said radiated beams of electromagnetic energy;

path deflections causing said electron beams to energize said antenna elements to radiate energy of modulated rf by intermittent bombardment of said semiconductor diode devices and phasing variations that cause the radiated electromagnetic energy of modulated rf to form beams in directions which will illuminate said predetermined locations.

8. The combination of claim 7 wherein said phasing variations arise from the interaction of said electron beams with fields having the same frequency as the spin frequency of said

9. The combination of claim 8 wherein said antenna elements are center grounded dipoles connected to both sides as the load of a semiconductor diode device and wherein said semiconductor diode devices are p-n junction devices.

* * * * *